(12) United States Patent
Mattes

(10) Patent No.: US 10,960,593 B2
(45) Date of Patent: Mar. 30, 2021

(54) SYSTEM FOR MONITORING THE POSITION OF THE CLOSING UNIT OF AN INJECTION MOLDING MACHINE

(71) Applicant: Kloeckner Desma Elastomertechnik GmbH, Fridingen (DE)

(72) Inventor: Klaus Mattes, Muehlheim (DE)

(73) Assignee: Kloeckner Desma Elastomertechnik GmbH, Fridingen (DE)

( * ) Notice: Subject to any disclaimer, the term of this patent is extended or adjusted under 35 U.S.C. 154(b) by 206 days.

(21) Appl. No.: 15/748,306

(22) PCT Filed: Jul. 29, 2016

(86) PCT No.: PCT/EP2016/068192
§ 371 (c)(1),
(2) Date: Feb. 14, 2018

(87) PCT Pub. No.: WO2017/017261
PCT Pub. Date: Feb. 2, 2017

(65) Prior Publication Data
US 2018/0222102 A1    Aug. 9, 2018

(30) Foreign Application Priority Data

Jul. 30, 2015 (DE) ..................... 10 2015 112 455.6

(51) Int. Cl.
*B29C 45/80* (2006.01)
*B29C 45/64* (2006.01)
(Continued)

(52) U.S. Cl.
CPC .............. *B29C 45/80* (2013.01); *B29C 45/64* (2013.01); *B29C 45/76* (2013.01); *B29C 45/34* (2013.01);
(Continued)

(58) Field of Classification Search
CPC ......... B29C 45/80; B29C 45/76; B29C 45/64; B29C 45/34; B29C 2945/76083;
(Continued)

(56) References Cited

U.S. PATENT DOCUMENTS 4,470,787 A * 9/1984 Gram ..................... B30B 1/323
264/40.5
4,828,473 A * 5/1989 Otake ................. B29C 45/5008
264/40.3
(Continued)

FOREIGN PATENT DOCUMENTS

DE    10 2013 101 997 A1    9/2013
DE    10 2013 011 849 A1    1/2014
(Continued)

OTHER PUBLICATIONS

International Search Report of PCT/EP2016/068192, dated Nov. 16, 2016.

*Primary Examiner* — Joseph S Del Sole
*Assistant Examiner* — Jamel M Nelson
(74) *Attorney, Agent, or Firm* — Collard & Roe, P.C.

(57) ABSTRACT

The invention relates to a system for monitoring the position of the closing unit of an injection-molding machine, by bypassing a light curtain that serves to secure the closing unit and the tool area of the injection-molding machine, wherein the injection-molding machine has at least one molding tool that consists of at least two parts, which tool encloses at least one mold cavity, wherein the injection-molding machine has a programmable logic controller (PLC) for controlling the movement monitoring module (MOC) for indirect position monitoring of the closing unit and of the position of the molding tool parts relative to one another, wherein distance measuring sticks are provided as sensors, the signals of which are processed in the PLC via the MOC, wherein the tool parts must maintain a spacing (Continued)

Figure 2:
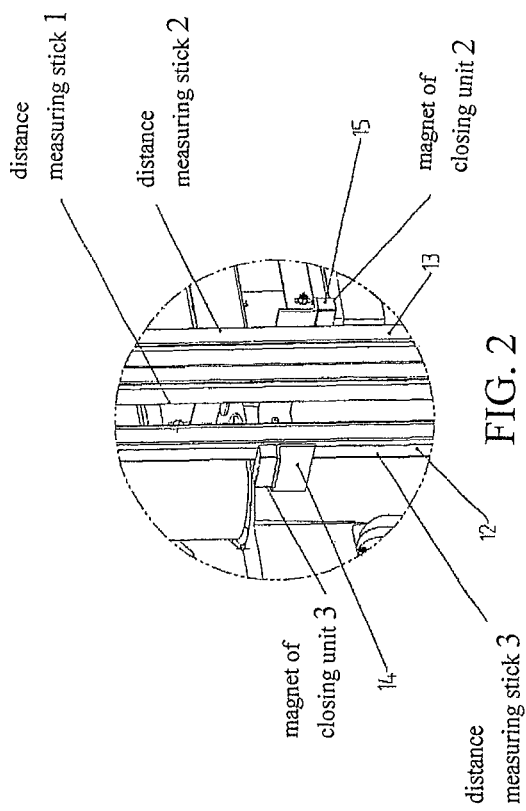

gap, relative to one another, after the closing pressure has been built up and the mold has been filled, during the subsequent bumping step, which gap has a specific maximal value assigned to it, with the injection-molding machine shutting off if this value is exceeded.

7 Claims, 2 Drawing Sheets

(51) Int. Cl.
 *B29C 45/76* (2006.01)
 *B29C 45/34* (2006.01)
(52) U.S. Cl.
 CPC ........... *B29C 2945/76083* (2013.01); *B29C 2945/76096* (2013.01); *B29C 2945/76113* (2013.01); *B29C 2945/76254* (2013.01); *B29C 2945/76387* (2013.01); *B29C 2945/76394* (2013.01); *B29C 2945/76461* (2013.01); *B29C 2945/76581* (2013.01); *B29C 2945/76732* (2013.01); *B29C 2945/76933* (2013.01); *B29C 2945/76943* (2013.01)

(58) Field of Classification Search
 CPC .......... B29C 2945/76933; B29C 2945/76461; B29C 2945/76387; B29C 2945/76113; B29C 2945/76096; B29C 2945/76943; B29C 2945/76732; B29C 2945/76581; B29C 2945/76394; B29C 2945/76254
 See application file for complete search history.

(56) References Cited

U.S. PATENT DOCUMENTS

| | | | | |
|---|---|---|---|---|
| 4,892,690 | A * | 1/1990 | Buja | ................ B29C 45/76 264/328.1 |
| 9,127,810 | B2 | 9/2015 | Koyama | |
| 2015/0202815 | A1* | 7/2015 | Murata | ................ B29C 45/76 264/40.5 |

FOREIGN PATENT DOCUMENTS

| | | |
|---|---|---|
| JP | 2001-145948 A | 5/2001 |
| JP | 2001-353759 A | 12/2001 |
| WO | 90/08638 A1 | 8/1990 |

\* cited by examiner

SYSTEM FOR MONITORING THE POSITION OF THE CLOSING UNIT OF AN INJECTION MOLDING MACHINE

CROSS REFERENCE TO RELATED APPLICATIONS

This application is the National Stage of PCT/EP2016/068192 filed on Jul. 29, 2016, which claims priority under 35 U.S.C. § 119 of German Application No. 10 2015 112 455.6 filed on Jul. 30, 2015, the disclosure of which is incorporated by reference. The international application under PCT article 21(2) was not published in English.

The invention relates to a system for monitoring the position of the closing unit of an injection-molding machine.

Although the system according to the invention is not restricted to this, it will be explained hereinafter using a vertical injection-molding machine.

The closing unit of the injection-molding machine moves the molding tool parts disposed on tool clamping plates, with the mold cavity disposed between them, into the closing position and builds up the corresponding closing pressure. Afterward, the mold cavity is filled with the corresponding material. Before the molding tool is completely opened using the closing unit, so that the finished injection-molded part can be removed, the molding tool is only opened with a slight gap at first, so that the cast part can degas. This method step is called bumping.

In order for this bumping to be able to take place with a bypassed light curtain, it must be ensured that the molding tool stands still in the gap position.

This gap monitoring was carried out, until now, either with cam switches that are affixed to the mold.

The second possibility was that of affixing reliable photoelectric sensors to the mold. These photoelectric sensors look through a gap having a width of about 6 mm. If the photoelectric sensor is interrupted, the mold is open by more than 6 mm, and the machine must reliably shut down. If the gap remains smaller than 6 mm, there is no risk for the machine operator, and the machine is allowed to perform the bumping sequence even if the photoelectric sensor is interrupted.

A disadvantage of these solutions was the great effort involved, since not only the cam switches but also the photoelectric sensors had to be newly adjusted at every tool change. This was time-consuming and also susceptible to failure.

From the Abstract of JP 2001-353 759 A, the information can be obtained that a position sensor for gap monitoring during bumping can be provided on an injection-molding machine.

From DE 10 2013 101 997 A1, monitoring of the molding tool of an injection-molding machine is also known, in which increasing deposits in ventilation gaps, by way of which degassing of the tool takes place, lead to deformations of the tool, wherein a spacing sensor system is used.

Furthermore, a motor power interruption circuit for specific irregularities in the production sequence is known from DE 10 2013 011, 849 A1, wherein the position of a safety door is also monitored.

Something similar is evident from JP 2001-145 948 A.

The invention is based on the task of improving a system of the type stated initially, in such a manner that the hardware effort and adjustment effort are significantly reduced.

The invention accomplishes this task, according to claim 1, by means of a system for monitoring the position of the closing unit of an injection-molding machine, by bypassing a light curtain that serves to secure the closing unit and the tool area of the injection-molding machine, wherein the injection-molding machine has at least one molding tool that consists of at least two parts, which tool encloses at least one mold cavity, wherein the injection-molding machine has a programmable logic controller (PLC) for controlling the production sequence in the machine, and the movement sequences during closing and opening of the molding tool are detected by sensors, and the sensor signals are processed in the PLC, wherein a movement-monitoring unit (MOC) is integrated into the PLC, for indirect position monitoring of the closing unit or of the position of the molding tool parts relative to one another, wherein distance measuring sticks are provided as sensors, the signals of which are processed in the PLC via the MOC, wherein one of the distance measuring sticks is responsible for monitoring the closing movement of the tool (the PLC reports: position has been reached), and two further measurement sticks are responsible for determining the position of the tool parts, wherein the tool parts maintain a spacing gap, relative to one another, after the closing pressure has been built up and the mold has been filled, during the subsequent bumping sequence, which gap has a specific maximal value assigned to it, with the injection-molding machine shutting off if this value is exceeded.

In this regard, the hardware effort is reduced to two additional position sensors and the MOC module.

Using the MOC (movement monitoring unit), it is possible to implement indirect position monitoring. The position of the closing unit is supposed to be monitored with this position monitoring, while the light curtain is interrupted. The mold is not allowed to open by more than 6 mm. The bumping function is possible without restrictions, since here the mold only has to be opened a few millimeters (1 to 2 mm). In order to be able to reliably detect the speed or the position, the module requires two distance data, which are detected by two independent, physically different distance measuring systems in an ideal case, in order to achieve a high CCF value, wherein CCF means "common cause failure factor." These distance measuring systems do not have to be fail-safe in the actual sense. However, in order to be able to calculate the safety of the overall system, what is called the MTTFd value is needed for the distance measuring system, in other words the mean time between safety-relevant defects or failures.

In the present case, an MTTFd value of 1,536,098 h is guaranteed.

The sequence of monitoring is the following, according to claim 2:

The mold closes until the tool is closed. The MOC module recognizes this standstill and receives the signal "position has been reached" from the PLC. Standstill monitoring is switched on by way of an additional input of the "speed monitoring" safety module present in the motion controller. Now the MOC module monitors a standstill position window of +/−3 mm, for example. If the mold remains within this +/−3 mm range, the module outputs a standstill and the light curtain can be bypassed. The problem with this indirect position monitoring is that "standstill" is signaled even in the case of a standstill outside of the position window. For this reason, a memory module is set at the start of monitoring, and reset as soon as the standstill signal drops. Then a plausibility check of the signals must still take place.

A separate logic editor exists in the PLC for the MOC module. This logic editor and the MOC module communicate with the remainder of the logic or CPU by way of a fixed interface (here with 18 bit input data and 16 bit output data). Furthermore, the MOC module possesses two hardware inputs for the two position sensors having the interfaces TTL, HTL, incremental RS-422, SIN/COS, SSI.

The program for monitoring the standstill position window described above is composed of two modules. The first module compares two speed signals of the hardware inputs of the module and emits a reliable speed signal. This reliable speed signal is applied to the speed monitoring module. In addition to the speed signal, this module also receives a release signal that turns the monitoring on/off. The module is configured in such a manner that it detects the relative position change when the monitoring is activated, and checks whether it remains in the window of +/−3 mm. The signal for release comes from the CPU or from the standard logic of the safety PLC. In this regard, monitoring release presumes that the mold is closed and that the closing pressure has been built up. These signals are monitored, with regard to their signal sequence, by way of the "switch evaluation" module. The status is stored in memory, using an RS flip-flop, as long as safety of the MOC module exists. A further requirement is that the "position has been reached" signal is logic 1 during the entire process. The signals are monitored, with regard to their signal sequence, by way of the switch evaluation module.

The "pressure has been built up" signal comes from a pressure switch that monitors the closing pressure of the machine.

The "position has been reached" signal is generated by the PLC under the following conditions:

Bumping is active; mold was completely closed once (distance measurement of the PLC at 0 mm).

The hardware structure on a vertically operating injection-molding machine will be presented below, using drawings.

Figure 1:
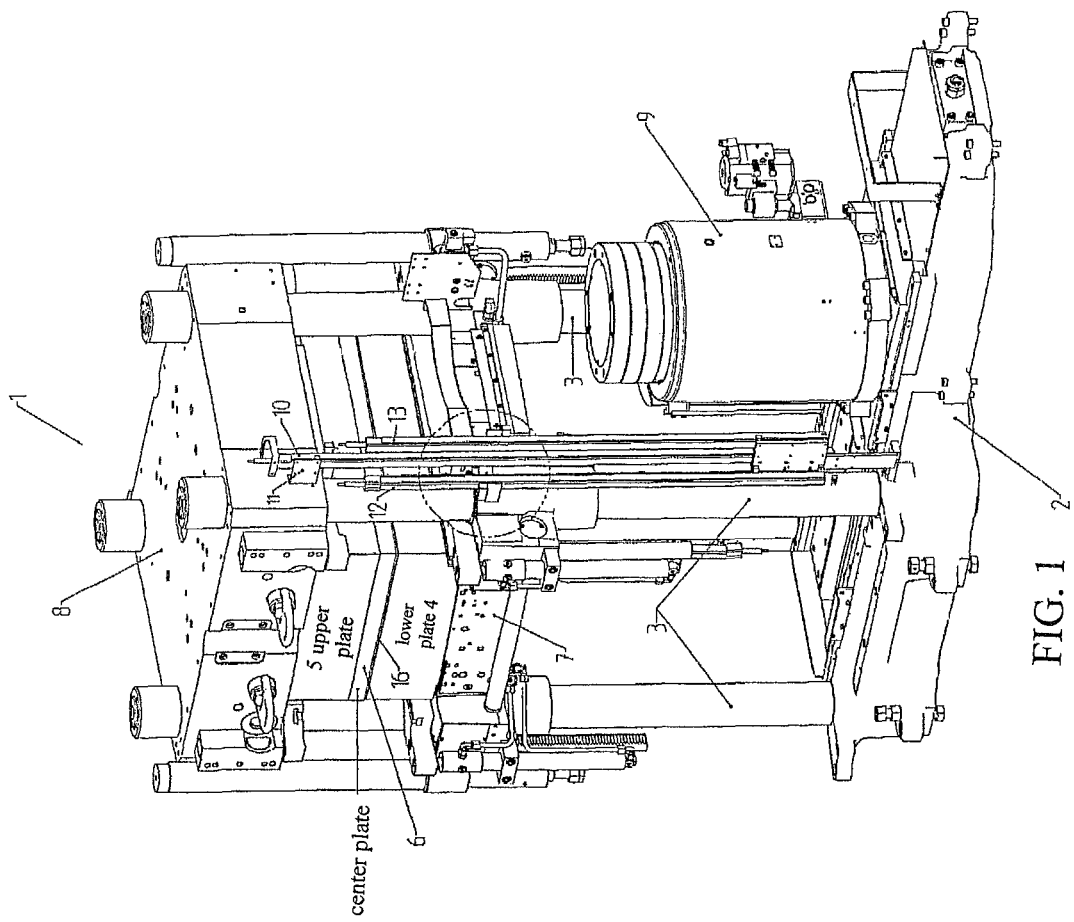
Figure 3:
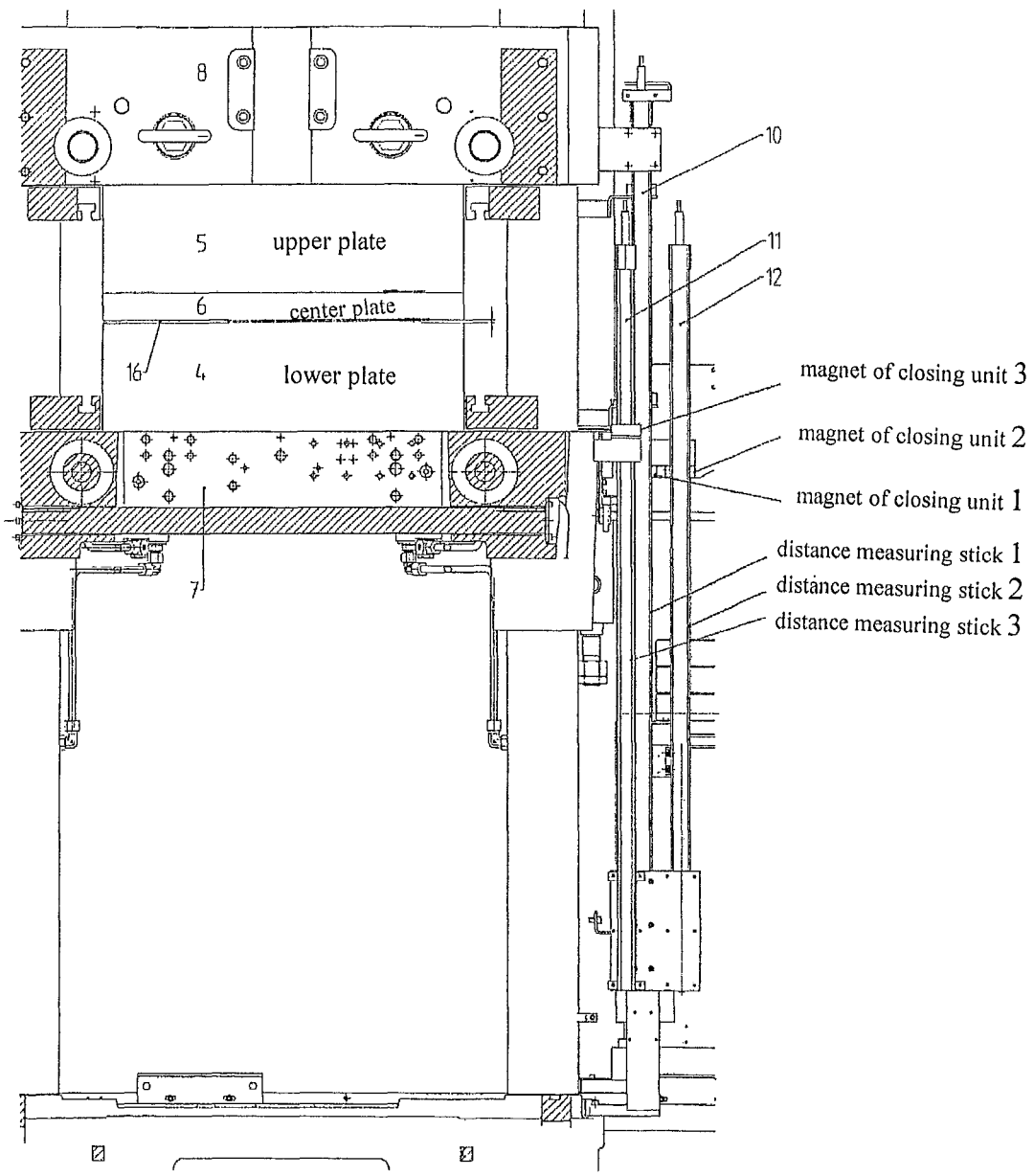

These show:

FIG. 1: in a perspective representation, a vertically operating injection-molding machine;

FIG. 2: detail enlargement C from FIG. 1;

FIG. 3: placement of the distance measuring sticks on the injection-molding machine according to FIG. 1 in a side view.

A vertically operating injection-molding machine is shown in FIG. 1 and provided, in general, with the reference symbol 1. It consists of a machine bed 2 and columns 3 that rise perpendicularly from the machine bed 2, on which columns the mold tool that consists of upper plate 4, lower plate 5, and center plate 6, which plates are disposed on a lower and an upper mold clamping plate 7 and 8, can be brought into the closing or opening position. The pressure-medium cylinder 9, which builds up the closing pressure in the closing position of the mold tool 4 to 6, is moved out of the machine in the representation.

A first distance measuring stick, which monitors the closing position of the molding tool before the injection-molding process, in interaction with the magnet 11, is indicated with the reference symbol 10.

Two further distance measuring sticks 12 and 13, in interaction with the magnets 14 and 15, serve to monitor the positions of the upper/center plate 5, 6 relative to the lower plate 4, and, in this function, serve to monitor the gap width of a gap 16 between lower and center/upper plate that is required during the bumping sequence (degassing of the molded part).

The signals of the distance measuring sticks 10, 12, 13 are passed on to the machine controller, which is not shown in any detail, as has been described in detail above.

The invention claimed is:

1. An apparatus comprising:
    an injection-molding machine comprising a tool area, a closing unit and a light curtain that serves to secure the closing unit and the tool area; and
    a system for monitoring the position of the closing unit of the injection-molding machine, by bypassing the light curtain that serves to secure the closing unit and the tool area of the injection-molding machine,
    wherein the injection-molding machine further comprises:
    at least one molding tool that comprises at least two molding tool parts; and
    a programmable logic controller (PLC) for controlling the production sequence in the machine;
    wherein the PLC has a movement-monitoring unit (MOC) for indirect position monitoring of the closing unit and of the position of at least two molding tool parts relative to one another;
    wherein the movement sequences during closing and opening of the molding tool are detected by a plurality of sensors comprising a plurality of distance measuring sticks, and the sensor signals are processed in the PLC via the MOC;
    wherein the at least two molding tool parts enclose at least one mold cavity;
    wherein one of the distance measuring sticks is responsible for monitoring the closing movement of the molding tool parts (distance measurement at 0 mm), and two further measurement sticks are responsible for determining the position of the at least two molding tool parts;
    wherein the PLC controls the at least two tool molding parts to maintain a spacing gap, relative to one another, after the closing pressure has been built up and the mold has been filled, during the subsequent bumping step, which spacing gap has a specific maximal value assigned to it, with the injection-molding machine shutting off if the specific maximum value is exceeded;
    wherein the MOC comprises a program comprising first and second modules (MOC modules) for monitoring a standstill position window;
    wherein the first module compares first and second speed signals of first and second hardware inputs of the MOC module and emits a reliable output speed signal, which is applied to the second module for speed monitoring, wherein the second module receives from the PLC a release signal in addition to the output speed signal, which release signal turns the monitoring on/off and is configured, in this regard, in such a manner that it detects the relative position change when monitoring is activated, and checks whether it remains within the standstill position window of +/−1-3 mm; and
    wherein the output speed signal and the release signal are monitored by way of a switch evaluation module, in terms of a signal sequence so that the monitoring is able to be turned off only when the mold tool is closed and the closing pressure has been built up.

2. The apparatus according to claim 1, wherein the movement sequences of the injection-molding machine comprise the following steps:
    a.) the closing unit closes the at least one molding tool and the MOC recognizes the standstill;
    b.) the standstill monitoring is turned on by way of the speed monitoring in the MOC module;
    c.) the MOC module monitors the standstill position window of +/−1-3 mm; and d.) if the at least one molding tool remains within the standstill position window of +/−1-3 mm, the MOC module recognizes the standstill and the light curtain can be bypassed.

3. The apparatus according to claim 1, wherein a memory module is set at the start of monitoring and is reset as soon as the standstill signal falls outside the standstill position window of +/−1-3 mm.

4. The apparatus according to claim 1, wherein the MOC module has a separate logic editor, which communicates with the PLC by way of a fixed interface.

5. The apparatus according to claim 4, wherein the first and second hardware inputs are provided with interfaces that can be selected from the group:
 TTL,
 HTL,
 Incremental RS-422,
 SIN/COS, and
 SSI.

6. The apparatus according to claim 1, wherein a position has been reached signal is logic 1 during the entire process.

7. The apparatus according to claim 1, wherein a pressure switch monitors the closing pressure of the injection-molding machine.

* * * * *